MAGNETIC CORE STORAGE SYSTEMS

Filed Aug. 25, 1955

INVENTORS:
TOM KILBURN,
GEORGE R. HOFFMAN
By: Stevens, Davis, Miller & Mosher
Attorneys United States Patent Office 2,911,627

Patented Nov. 3, 1959

2,911,627

MAGNETIC CORE STORAGE SYSTEMS

Tom Kilburn, Urmston, and George Richard Hoffman, Manchester, England, assignors to National Research Development Corporation, London, England, a British corporation Application August 25, 1955, Serial No. 530,453

Claims priority, application Great Britain August 31, 1954

12 Claims. (Cl. 340—174)

This invention relates to apparatus for the storage of information and of the kind in which the various information items such as binary number digits can have one or the other of two alternative values which are represented respectively by the direction of magnetic polarisation of a magnetic core.

In copending application No. 530,452, filed August 25, 1955, by T. Kilburn and G. R. Hoffman there is described an improved method of and arrangements for determining the state of magnetisation i.e. direction of polarisation, in a magnetic circuit by a process of altering the reluctance of such magnetic circuit and thereby causing the induction, in an appropriate winding linking such circuit, of an E.M.F. whose polarity or phase is indicative of the direction of magnetisation. The magnetic circuit concerned may be either one which contains a remanent magnetic flux or one which has a magnetic flux induced therein from some external source. The requisite alteration of reluctance can be effected, as is described in the aforesaid copending application, by application of a suitable modulation current either to a winding which interlinks only a part of the core cross-section or directly to a localised region of the magnetic circuit itself whereby a localised flux is set up in a relatively small part only of the core.

The object of the present invention is to provide improved binary digital storage arrangements utilising the above described method.

In accordance with the broadest aspect of the invention, an information storage arrangement, e.g. for binary numbers or like information items, comprises a plurality of storage members, each having means defining a separate magnetic circuit of which at least a part is of magnetically retentive material having a hysteresis loop characteristic of substantially rectangular form, each of said members having also electric current-operated means for altering the reluctance of its magnetic circuit together with at least one electric conductor interlinking such magnetic circuit, the electric current-operated reluctance-altering means of different groups of said members being inter-connected for conjoint excitation with either a direct-current for inhibiting operation of such group of members whilst a write-input signal is applied to at least one of the associated interlocking conductors or with a modulating current of alternating or fluctuating form whilst a read output signal is derived from at least one of said interlinking conductors.

In a particular embodiment according to the invention the magnetic circuits of each of said members each comprise a retentive and a non-retentive part, the retentive parts being all arranged to lie in a single first plane and the non-retentive parts being all located in a displaced but parallel second plane, each of said separate non-retentive magnetic circuit parts including a magnetic flux gap which is completed by the adjacent and associated retentive part, the interlinking conductors for said magnetic circuits being themselves all located in a further parallel third plane disposed intermediate said first and second planes each of said conductors being disposed to lie coincident with the aforesaid gap in the associated non-retentive part whereby the magnetic flux circulating around each of the magnetic circuits constituted by each retentive part and its associated non-retentive element is effectively linked by the associated conductor.

In order that the above and other features of the invention may be more readily understood a number of embodiments thereof will now be described in greater detail with reference to the accompanying drawings, in which:

Fig. 1*a* is a diagrammatic perspective view of matrix-type storage device constructed in accordance with the invention.

Figs. 1*b* and 1*c* are fragmentary views showing modifications of Fig. 1*a*.

Figures 1A, 1B, 1C, 2, 3, 4, 5, 6:
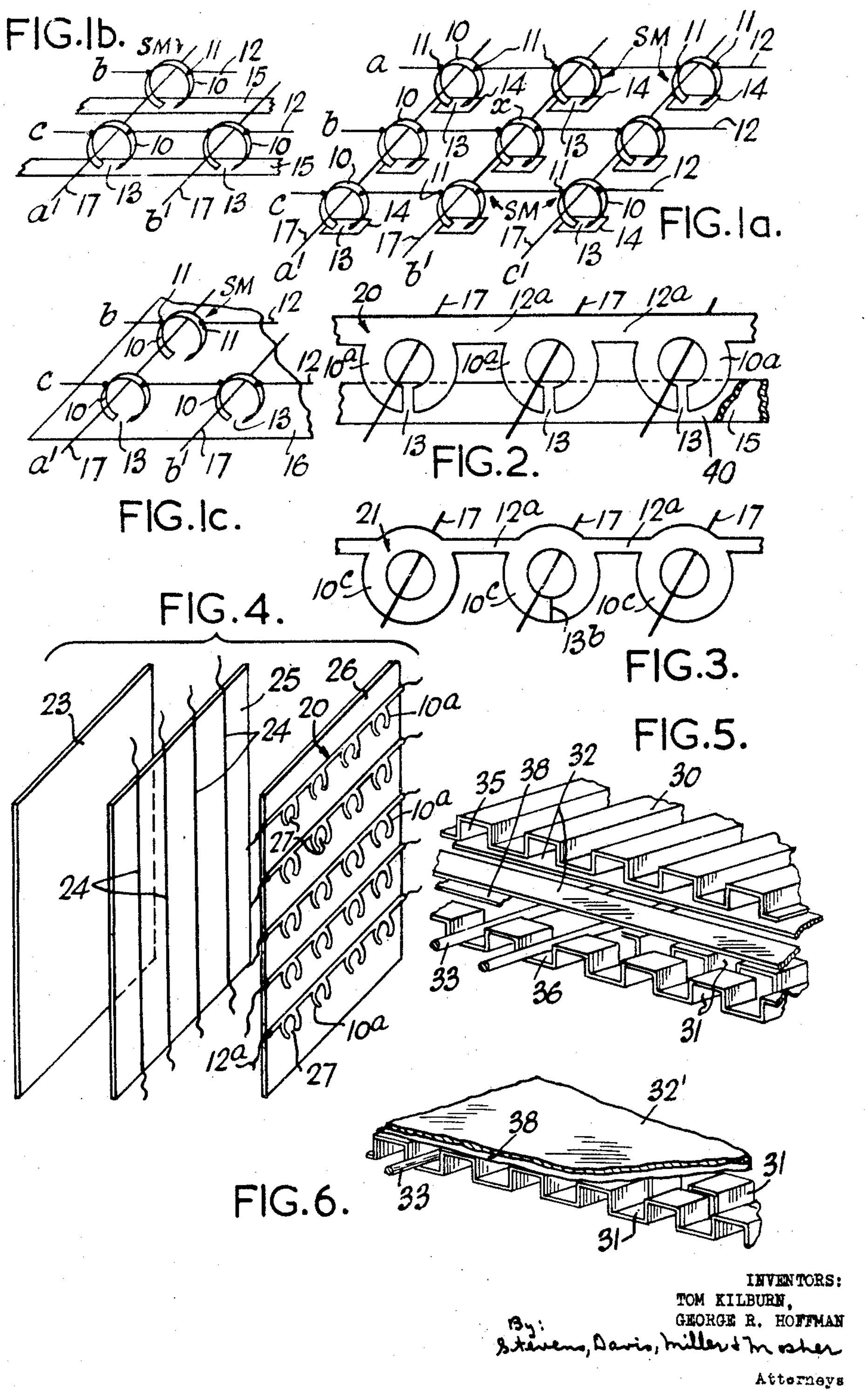
Fig. 2 is an enlarged and more detailed diagrammatic view of one constructional form of a group of core elements.
Fig. 3 is a view similar to Fig. 2 showing an alternative arrangement.
Fig. 4 is an exploded diagrammatic perspective view showing the parts of a matrix type storage device in accordance with another embodiment of the invention.
Figs. 5 and 6 are exploded perspective views of yet further modifications.

Referring first to the arrangement shown in Fig. 1*a*, the storage device illustrated comprises a plurality of storage members SM arranged as a matrix of rows *a*, *b*, *c* and columns *a'*, *b'*, *c'*. Each storage member comprises a gapped ring-shaped magnetic core part 10 formed of non-retentive magnetic material, such as Mu-metal. Each part 10 is provided with spaced-apart current tapping points 11 and the various core parts in each row *a*, *b*, *c* are electrically inter-connected in series between such tapping points 11 by means of separate row conductors 12 in a manner similar to that described in the aforesaid copending application whereby a current of suitable form may be passed by way of such conductor 12 through a portion only of each of the core parts 10 in a row. The gapped regions 13 of each magnetic core part 10 are disposed immediately adjacent to a further core part 14 made of retentive magnetic material of a type having a hysteresis loop characteristic which is of substantially rectangular form. The magnetic circuit of each storage member SM is therefore that provided by the associated part 10 and completed across the gap 13 by passage through the associated retentive material part 14. Such retentive material parts 14 may each be separate pieces as indicated in Fig. 1*a* drawing or, alternatively, the various retentive parts 14 associated with each row *a*, *b*, *c* of storage members SM may be in the form of a single strip of retentive material as illustrated in Fig. 1*b*. Alternatively each of the retentive parts associated with each column *a'*, *b'*, *c'* may be formed as a single strip. As a further alternative a single large sheet of uniformly retentive material may be used as indicated in Fig. 1*c* at 16. Through each of the core parts 10 of each of the columns *a'*, *b'* and *c'* of the matrix is disposed a further conductor 17 which constitutes means for writing-in or reading-out to or from any storage member.

With the arrangement as shown in Fig. 1*a*, if it is desired to write, for example, into the storage element *x* which lies in the second row *b* and in the second column *b'* of the matrix, a suitable direct current of a value appropriate to effect magnetic saturation of the portion of a core part 10 between the tapping points 11 is applied to the row conductors 12 of rows *a* and *b* while an appropriate writing-in current pulse is applied to the conductor 17 of the column $b'$. As a result of this only that retentive material core part 14 which lies opposite to the gap 13 of the core element $x$ will be affected by such writing-in current pulse since the corresponding core parts 10 of the storage members SM in column $b'$ which lie in rows $a$ and $c$ are at that time held saturated by the applied direct currents to the related row conductors 12. Subsequent reading-out from the same core element $x$ is effected by utilizing the same column conductor $b'$ as a read output conductor by connection to appropriate reading means as described in the copending application previously referred to and simultaneously applying an interrogating current to the row conductor 12 of the second row $b$, i.e. that which also passes through the required core. The remaining row conductors 12 are, in this instance, not energized.

As described in the aforesaid copending applications such interrogating current may be either an appropriately formed square pulse waveform or a sinusoidal alternating current of a first frequency $f$. In the latter case the resultant output at frequency $2f$ on conductor 17 of column $b'$ serves to indicate by the phasing of its output relative to a standard alternating current having a constant phase relationship to the input current waveform, the direction in which the previous write-in magnetization was effected and hence the value of, say, a stored binary digit.

Fig. 2 illustrates an alternative constructional form for the various non-retentive core parts 10 of a group of storage devices SM. These are arranged in the form of a single punched or otherwise formed strip of sheet magnetic metal 20, e.g. Mu-metal, having a plurality of gapped rings 10$a$ joined by an integral conductor bar 12$a$ which links each of the separate magnetic circuit-forming rings at points corresponding to those marked 11 in Fig. 1$a$. The rings 10$a$ have radial gaps 13 formed at points diametrically opposite to the side of the ring which is connected to the conductor bar 12$a$. The regions of each ring at each side of its gap 13 are arranged to overlie a strip 15 of magnetically retentive material, the undersurface of the rings 10$a$ and the upper surface of the strip 15 being in close-spaced parallel relationship with a layer of electric insulation 40 disposed therebetween to prevent current flow across the gap 13. This insulation is, of course, made as thin as possible.

Another alternative construction for the core storage devices SM is shown in Fig. 3 where each group of storage devices is constituted by a stamped or otherwise formed member 21 made wholly of retentive material. In this case each of the storage rings 10$c$ is complete, i.e. is ungapped. The requisite write-in or read-out conductor 17 may be threaded through the aperture in the associated magnetic circuit rings, but, more preferably, a radial break, as shown at 13$b$, is deliberately provided to facilitate the insertion of the related conductor 17 therethrough during assembly.

Fig. 4 illustrates a further modified construction wherein each of the component parts of a storage arrangement of the matrix type is of sheetlike or planar form. The first element of the arrangement comprises a single planar sheet 23 of magnetically retentive material. Adjacent this is positioned a second element consisting of a grid of parallel conductors 24, e.g. of copper wire, or of equivalent printed conductors, formed upon a planar sheet 25 of insulating material. Upon this second component element is disposed a third planar element 26 comprising a plurality of rows—forming groups 20 of non-retentive core parts 10$a$ shaped substantially in the manner indicated in Fig. 2. Each of the separate conductor bars 12$a$ of such groups of core parts provides a separate output connection for the passage of a modulating or a blocking current therethrough while each of the gaps 27 in the core parts 10$a$ is so positioned that when the sheets 23, 25 and 26 are assembled in a close-spaced face-to-face relationship the various gaps 27 of the plurality of groups of core parts which are in aligned vertical columns, coincide with the related one of the conductors 24 of the intermediate sheet 25. By reason of the interposed positioning of such conductors 24 to the gapped core parts 10$a$ and the sheet 23 of retentive material the magnetic circuit through each core part 10$a$ is completed via the immediately adjacent area of the sheet of retentive material and thereby interlinks the associated conductor 24 of the intermediate sheet 25 so that writing-in and reading-out can be effected in a similar manner to that described in connection with Fig. 1.

Fig. 5 shows a further alternative construction of storage arrangement in which a layer-like element formed by a channelled-section sheet 30 of non-retentive magnetic material co-operates with a plurality of separate strips 31 also of channelled section and also formed of non-retentive magnetic material. When disposed in close spaced parallel relationship to one another with each upwardly directed channel 35 in the sheet 30 opposite to a downwardly directed channel 36 of the strip 31, the parts define a series of rectangular section holes or tunnels. The various separate strips 31 are assembled in side-by-side relationship, slightly spaced apart but close to the sheet 30 and interposed between strips 31 and said sheet 30 is a further side-by-side arrangement of strips 32 which are made of magnetically retentive material. Suitable thin electric insulation such as a sheet 38 of polythene or of varnish is provided between, at least, the opposing surfaces of strips 31 and 32. In each of the transverse recesses formed by the side-by-side rows of channels 36 in the strips 31 is disposed a transverse conductor 33 which forms the equivalent of the column conductor 17 of Fig. 1. Each of the channelled strips 31 constitutes the equivalent of one of the row conductors 12 of Fig. 1 so that, by applying appropriate saturating currents (in the case of writing-in) to each of the channelled strips 31 except that in which the required magnetic storage region is located and then applying an appropriately polarized magnetizing current to the particular one of the transverse column conductors 33 so one particular region on one particular strip 32 of retentive material can be saturated and provides, by its permanent magnetism, a record of a particular digit value. Subsequent reading of the same stored digit value is effected, in a manner analogous to that already described with reference to Fig. 1, by applying an appropriate modulating current to the channelled strip 31 of the required row and determining the phase of the harmonic output frequency which is available on the associated column conductor 33.

In the further alternative embodiment shown in Fig. 6 the channelled sheet 30 is dispensed with and use made instead of only the strips 31 and a single sheet 32[1] of retentive magnetic material, the latter being, in effect, a combination of the strips 32 of Fig. 5.

The arrangements described are capable of wide modification and adaptation. For example, a storage device for a computing machine or other apparatus operating with binary coded signals may comprise arrangements similar to those described above, particularly in connection with Fig. 4 and means provided for the initial setting up, as by the use of a key-operated device resembling a typewriter, of the appropriate magnetisation pattern on the sheet 23 of retentive material in a series of rows and columns corresponding to the input information items which are required to be inserted in the data store of the machine. Alternatively the store of the machine may comprise a plurality of arrangements resembling elements 25 and 26 of Fig. 4 and these may be disposed serially in a single plane so that the various associated portions of retentive material resembling element 23 of Fig. 4 can be interconnected in the form of a continuous tape or ribbon which, after its initial preparation outside the computing machine with a predetermined magnetisation pattern representing input data, may be fed thereinto where it becomes, for the time being at least, the active element of the various sections of the data store of the machine. While located in such a store the input recordings on the elements 23 may be modified as desired during the course of computation by the machine and afterwards withdrawn as output data and replaced by new sections of retentive sheet material bearing recordings of the further data items required for the next computation operation and so on.

We claim:

1. An information storage arrangement for registering a plurality of information items, such as binary number digit values, each having one or the other of two alternative values, said arrangement comprising a plurality of storage members, one for each information item to be stored, each of said members having means defining an individual magnetic circuit having a first part constituted by a body of magnetically retentive material having a hysteresis loop characteristic of substantially rectangular form and a second part of non-retentive magnetic material, each of said members having also electric current-operated means for altering the reluctance of the magnetic circuit thereof through said second part, first circuit means interconnecting said reluctance altering means of said storage members for simultaneous energisation in first groups each including a predetermined number of said members, no one member being included in more than one group, and a plurality of electric conductors interlinking the magnetic circuits of said storage members for conjoint operation in second groups each of said conductors interlinking a predetermined number of said members, each of said second groups including not more than one member of each of said first groups.

2. An information storage arrangement for registering a plurality of information items, such as binary number digit values, each having one or the other of two alternative values, said arrangement comprising a plurality of storage members, one for each information item to be stored, said members being arranged in a matrix of rows and columns and each member having means defining an individual magnetic circuit of which at least a part is constituted by a body of magnetically retentive material having a hysteresis loop characteristic of substantially rectangular form, the magnetically retentive parts of each of the members in any row being formed by a single piece of sheet material, each of said members having also electric current-operated means for altering the reluctance of the magnetic circuit thereof, circuit means for interconnecting said electric current-operated reluctance altering means of each of said storage members of each row for simultaneous energisation and a plurality of column conductors, each of said column conductors interlinking the magnetic circuit of one member in each row.

3. An information storage arrangement for accommodating a plurality of information items, such as binary number digits, each having one or the other of two alternative values, said arrangement comprising a plurality of storage members, one for each item to be stored, arranged in a matrix of rows and columns, each of said members having means defining an individual magnetic circuit of which at least a part is constituted by a body of magnetically retentive material having a hysteresis loop characteristic of substantially rectangular form, electric current connections at spaced apart points along the length of the magnetic circuit through each of said members, circuit means serially interconnecting said spaced apart points of each of said members of each row of said matrix for simultaneous energisation and a plurality of separate electric column conductors each interlinking the magnetic circuit of one member of each of said matrix rows and with no member common to more than one column conductor.

4. An information storage arrangement for accommodating a plurality of information items, such as binary number digits, each having one or the other of two alternative values, said arrangement comprising a plurality of storage members, one for each item to be stored, arranged in a matrix of rows and columns, each of said members having means defining an individual magnetic circuit of which at least a part is constituted by a body of magnetically retentive material having a hysteresis loop characteristic of substantially rectangular form, electric current connections at spaced apart tapping points along the length of the magnetic circuit through each of said members, circuit means serially interconnecting said spaced apart tapping points of each of said members of each row of said matrix for simultaneous energisation, the magnetically retentive parts of each member in any one row and said circuit means of such row being formed by a one-piece element and a plurality of separate electric column conductors each interlinking the magnetic circuit of one member of each of said matrix rows and with no member common to more than one column conductor.

5. An information storage arrangement for accommodating a plurality of information items such as binary number digits each having one or the other of two alternative values, said arrangement comprising a plurality of magnetic storage members, one for each information item to be stored, arranged in a matrix of rows and columns, each of said members having means defining an individual magnetic circuit by way of a first part of retentive magnetic material and a second part of non-retentive magnetic material, said first part material having a hysteresis loop characteristic of substantially rectangular form, electric current-operated means for altering the reluctance of the magnetic circuit through said second part of each of said storage members, circuit means for connecting the current-operated reluctance altering means of each of the members of each matrix row for conjoint energisation and a plurality of column conductors each interlinking the magnetic circuit of an individual one of the members of each of said matrix rows.

6. An arrangement as claimed in claim 5 wherein said electric current-operated reluctance altering means comprises electric current connections at spaced apart tapping points along the length of the magnetic circuit through said first part of each of said members.

7. An arrangement as claimed in claim 6 wherein said reluctance altering means of the storage members of each matrix row are connected in series by interconnection of said tapping points.

8. An arrangement according to claim 1 wherein the retentive first parts of each group of said storage members are arranged to have operative surfaces lying in a single first plane and wherein the non-retentive second parts of the same group of storage members are arranged to have operative surfaces lying in a second plane displaced from but parallel to said first plane, each of said non-retentive second parts including a magnetic flux gap which is completed by the adjacent and associated retentive first part.

9. An arrangement according to claim 8 in which the interlinking conductors for said magnetic circuits of said group of storage members are all located in a further third plane disposed parallel to and in between said second and first planes, said conductors being each positioned to lie in alignment with the magnetic flux gap of the immediately adjacent and associated non-retentive second magnetic circuit part.

10. An arrangement according to claim 9 wherein the second magnetic circuit parts of each group of storage members and the associated reluctance altering means and first circuit means are constituted by a one-piece member of sheet material.

11. An information storage arrangement for registering a plurality of information items, such as binary number digit values, each having one or the other of two alternative values, said arrangement comprising a plurality of elongated thin metal strips of non-retentive magnetic material, each of said strips being bent to corrugated form providing a plurality of channels spaced apart in the longitudinal direction of the strip and said strips being disposed in parallel side-by-side relationship with their respective channels in alignment, a plurality of strips of magnetically retentive material disposed immediately adjacent to and in alignment one with each of said strips of non-retentive material so as to close said channels and a plurality of electric conductors disposed transversely to said strips, one within each of the groups of aligned channels of said non-retentive strips.

12. An information storage arrangement for registering a plurality of information items, such as binary number digit values, each having one or the other of two alternative values, said arrangement comprising a plurality of elongated thin metal strips of non-retentive magnetic material, each of said strips being bent to corrugated form providing a plurality of channels spaced apart in the longitudinal direction of the strip and said strips being disposed in parallel side-by-side relationship with their respective channels in alignment, a sheet of magnetically retentive material disposed immediately adjacent to said strips of non-retentive material so as to close said channels and a plurality of electric conductors disposed transversely to said strips, one within each of the groups of aligned channels of said non-retentive strips.

References Cited in the file of this patent

UNITED STATES PATENTS

| | | |
|---|---|---|
| 2,683,819 | Rey | July 13, 1954 |
| 2,724,103 | Ashenhurst | Nov. 15, 1955 |
| 2,781,503 | Saunders | Feb. 12, 1957 |
| 2,825,891 | Duinker | Mar. 4, 1958 |
| 2,825,892 | Duinker | Mar. 4, 1958 |